United States Patent

Deeds

[15] 3,640,798
[45] Feb. 8, 1972

[54] COMPOSITE STRUCTURAL CORE ASSEMBLY

[72] Inventor: Douglas Deeds, 1706 West Arbor Drive, San Diego, Calif. 92103

[22] Filed: Apr. 16, 1969

[21] Appl. No.: 816,524

[52] U.S. Cl. ............................. 161/68, 161/69, 161/109, 161/113, 161/127, 161/139, 161/161
[51] Int. Cl. .................. B32b 3/24, B32b 3/18, B32b 3/12
[58] Field of Search ........... 161/127, 135, 159, 136, 134, 161/68, 69, 112, 133, 137, 160, 161; 156/205, 206, 210, 459, 462, 470, 473, 590, 596; 52/408, 410, 411, 615, 618, 669, 674

[56] References Cited

UNITED STATES PATENTS

| | | | |
|---|---|---|---|
| 1,974,279 | 9/1934 | Jones | 161/69 X |
| 2,609,068 | 9/1952 | Pajak | 161/68 |
| 2,644,777 | 7/1953 | Havens | 161/68 X |
| 2,893,076 | 7/1959 | Herts | 161/68 X |
| 2,910,153 | 10/1959 | Campbell | 161/68 X |
| 2,959,257 | 11/1960 | Campbell | 161/68 |
| 3,017,971 | 1/1962 | Christman | 161/68 UX |
| 3,018,205 | 1/1962 | Barut | 161/68 |
| 3,356,555 | 12/1967 | Jackson | 156/205 |

*Primary Examiner*—Willard E. Hoag
*Attorney*—Jessup & Beecher

[57] ABSTRACT

A curved laminated structure comprising a series of generally longitudinally extending stringers are assembled generally transversely adjacent, each stringer being composed of upright webs extending alternately solely longitudinally and transversely defining a longitudinal series of stringer web enclosures opening at opposite web edges. The webs have elongated members such as rods extending through them. The enclosures or cells are preferably filled with polymer foam.

8 Claims, 26 Drawing Figures

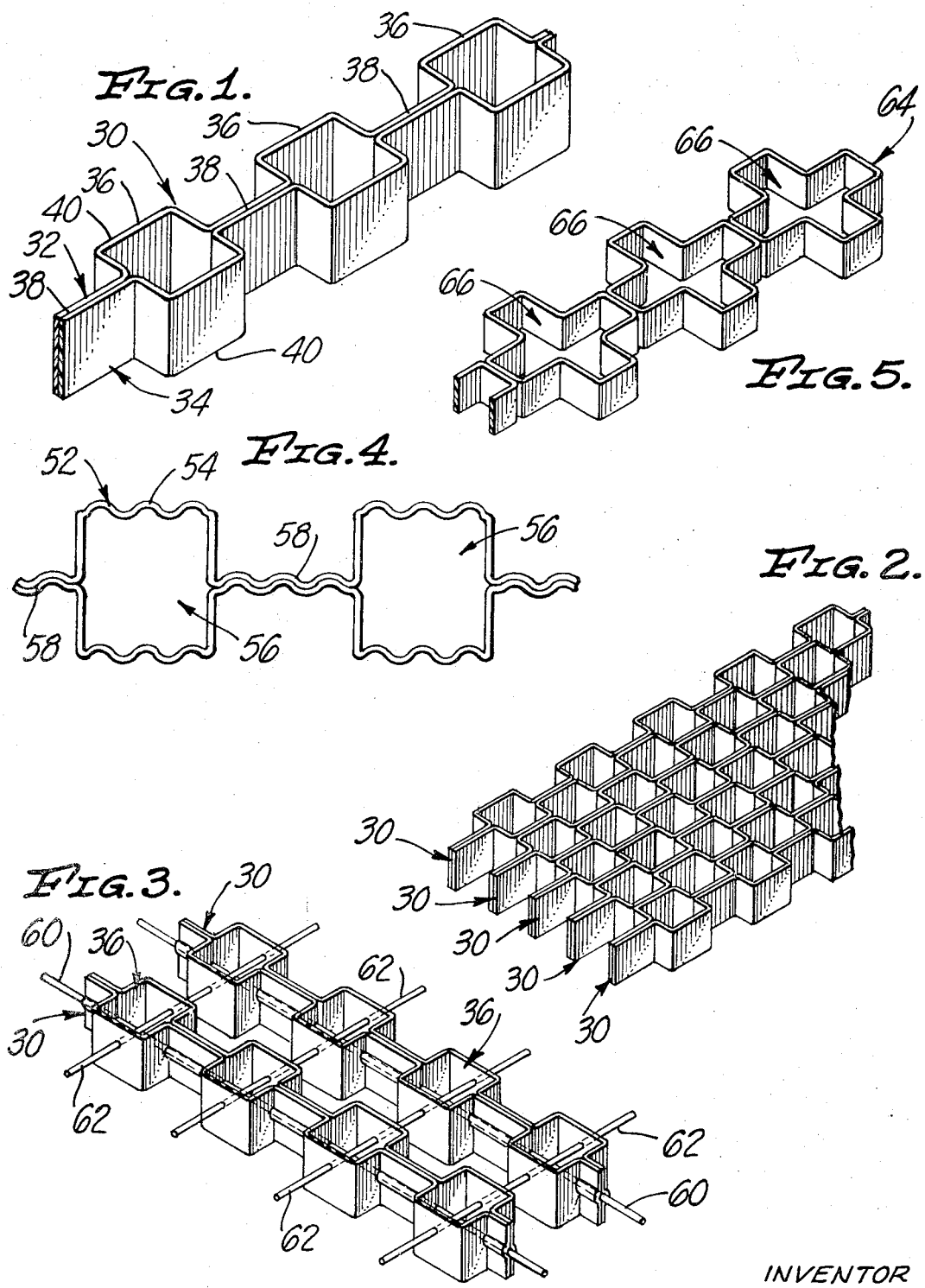

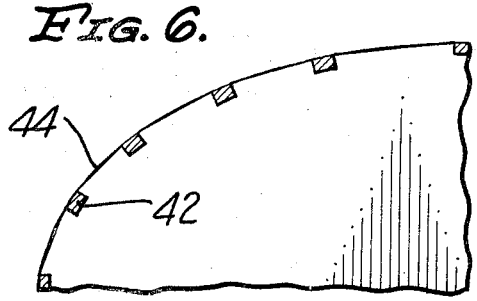
FIG. 6.
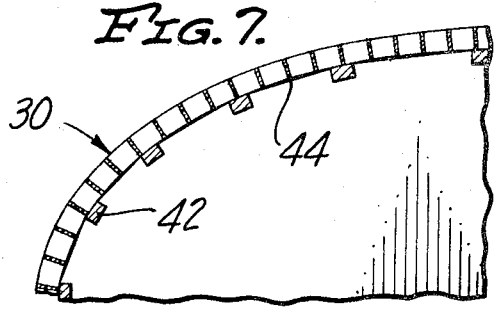
FIG. 7.
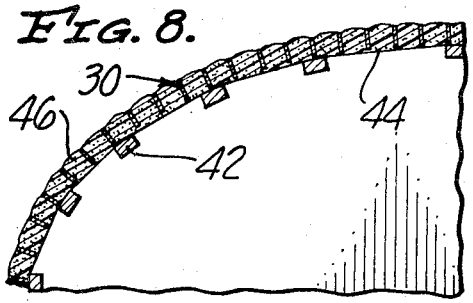
FIG. 8.
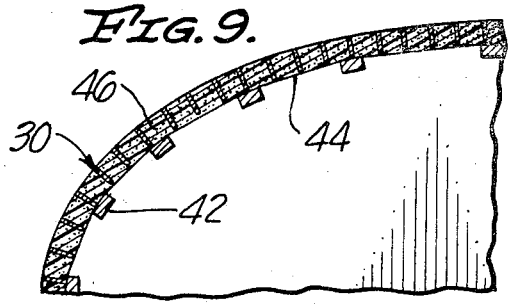
FIG. 9.
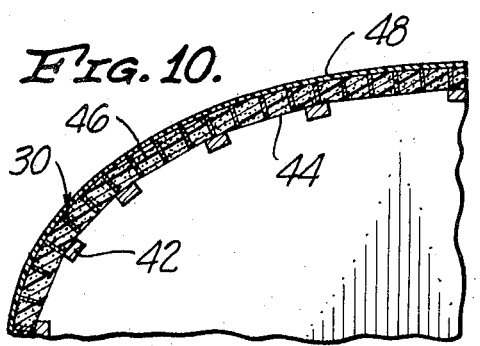
FIG. 10.
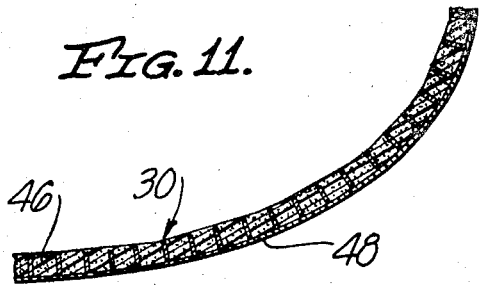
FIG. 11.
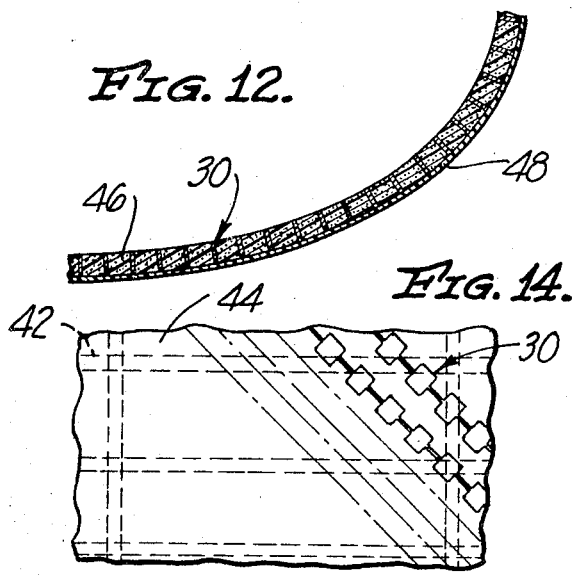
FIG. 12.
FIG. 14.
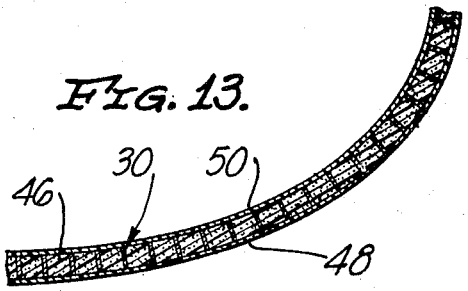
FIG. 13.
INVENTOR
DOUGLAS DEEDS
BY
MAHONEY, HORNBAKER
& SCHICK
ATTORNEYS

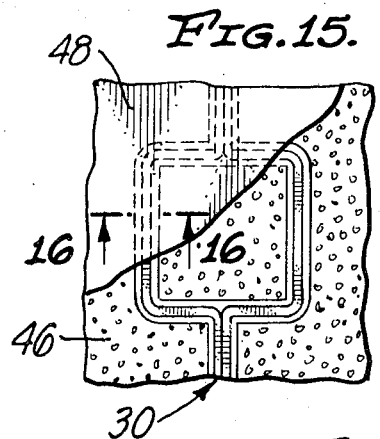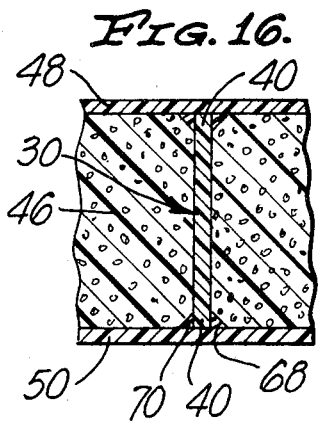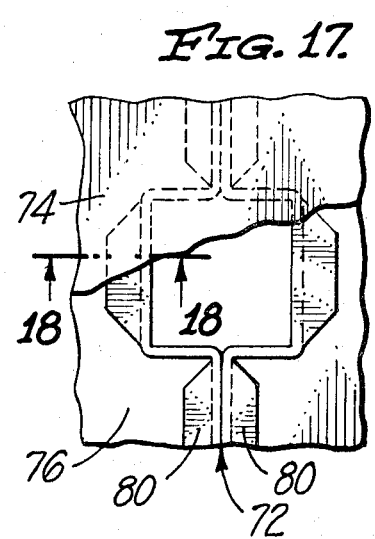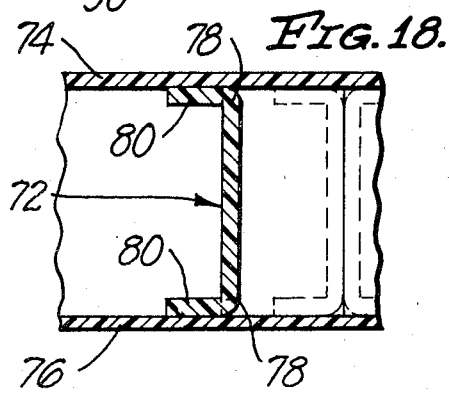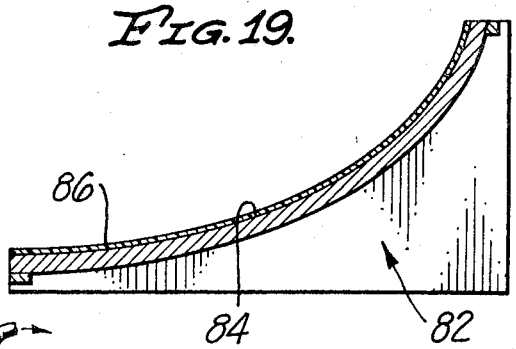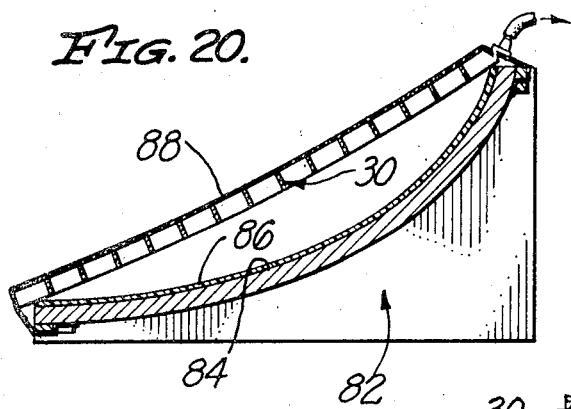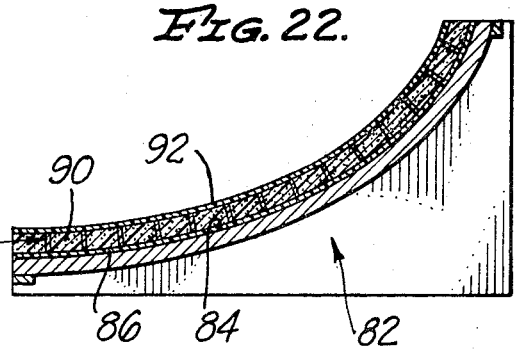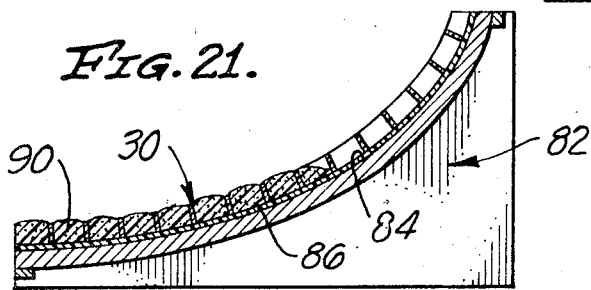

INVENTOR
DOUGLAS DEEDS
BY
MAHONEY, HORNBAKER
& SCHICK
ATTORNEYS

COMPOSITE STRUCTURAL CORE ASSEMBLY

BACKGROUND OF THE INVENTION

This invention relates to a composite structural core assembly of the type composed of an upright web core structurally joined to and separating spaced surface layers wherein the final composite assembly has at least portions of the surface layers describing progressively curved surfaces, and even compound curved surfaces, yet without appreciable distortion of the webs forming the core and without any appreciable loss of web compressive strength in the final composite assembly. More particularly, this invention relates to various forms of a composite structural core assembly and methods of making the same, the composite assembly having a core formed of a series of transversely adjacent, generally longitudinally extending stringers each comprised of continuously connected upright webs extending solely generally longitudinally and generally transversely describing a longitudinal series of stringer voids, the stringer-formed core being sandwiched between spaced surface layers secured to opposite stringer web edges, and with the final composite assembly having at least portions thereof curved as discussed. For additional strength and improved structural integrity in the final composite assembly, a cellular foam may be installed filling between the core stringers, preferably including the voids thereof, and adhering to both the stringer webs and the surface layers, the foam having at least shape-self-sustaining rigidity in final foamed form.

Various prior constructions of structural core assemblies have heretofore been provided, most of which have been of the so-called "honeycomb core" type. In the honeycomb core constructions, a sheet of integrated honeycomb cells is formed, each cell consisting of a five- or six-sided, upright web enclosure, the upper and lower web edges of the integrated cells describing web-spaced sheet surfaces. After the formation of the integrated cell, honeycomb core sheet, surface layers are positioned over the upper and lower sheet surfaces secured to the cell web edges providing a final integrated sandwiched assembly.

One of the major difficulties with these prior honeycomb-core-type structural core assemblies is that it is extremely difficult, and in many cases virtually impossible, to form the structural core assembly sheets curved or any portions thereof curved while still retaining proper structural integrity and strength, particularly crush strength. In other words, when it is attempted to form these honeycomb core sheets curved in directions toward the cell web edges resulting in the surface layers being progressively curved in the final assembly, and where the curves are of any appreciable degree, the cells at the curved portions have at least parts of the webs forming the same sharply distorted with any structural integrity thereof and web edge crush strength severely damaged or virtually destroyed. The principal reason for this damaging cell web distortion is occasioned by the particular configuration of the individual cells, the five- or six-sided cells always having certain web parts thereof which must twist and distort severely during the curving of the core sheet, even though other cell web parts might merely be required to lengthwise flex with minimum twisting and distortion so as to retain structural integrity and edgewise crush strength.

Another marked disadvantage of these prior honeycomb-core-type structural core assemblies is that, due to the relatively complicated and many-angled individual cell configurations, it is virtually impossible using standard components to form structural core assemblies of varying size, shape and curving configurations. The result is that, with regard to size, the honeycomb core assemblies have usually been formed of standard size sheets and merely cut to desired size at the time of forming the overall structure. With regard to structures of varying curved configurations, it has usually been necessary to custom-design and form the honeycomb core assemblies to be used in constructing the same, all adding to the final material and labor costs.

OBJECTS AND SUMMARY OF THE INVENTION

It is, therefore, an object of this invention to provide a composite structural core assembly of the type formed by a series of structurally integrated, upright web cells having surface layers secured to the cell web edges wherein the overall structural core assembly may be formed having portions thereof curved in directions toward the cell upright web edges while still maintaining structural integrity and web crush strength of all of the cell web parts. According to the present invention, all of the core cells are formed of alternate solely generally longitudinally and generally transversely extending web parts so that primarily lengthwise flexing of the cell web parts will take place during the curved formation with minimal twisting distortion. The result is that maximum cell web structural integrity is retained without crush strength loss despite relatively high degrees of curvature and including compound curvatures.

It is a further object of this invention to provide a composite structural core assembly of the foregoing general form wherein cellular foam of varying types may be incorporated in the composite structural core assembly during the formation thereof to give even further increased structural integrity and crush strength where desired. In one method of assembly, after the upright web cells are integrated into the desired sheet form and the cell sheets placed in the desired curved configurations, all voids within the cell sheets are filled with a foam material adhering to the cell webs and assuming structural rigidity in final foamed form, after which, the surface layers are secured to the cell web edges and simultaneously adhere to the foam. In another method of assembly, after cell sheet formation and while still in flat form prior to curving, the cell sheet is foam-filled with the foam adhering to the cell webs, the combined cell and foam sheet heated and formed into the desired curvature, and the surface layers then applied secured to the cell web edges and adhered to the foam. In either form, the integrated foam adds appreciably to the crush strength of the assembly and the structural integrity thereof.

It is another object of this invention to provide a composite structural core assembly of the foregoing general type and having the various advantageous characteristics wherein the upright web cells forming the core portion of the assembly are preferably formed by a series of transversely adjacent, generally longitudinally extending stringers, each composed of continuously connected upright webs defining a longitudinal series of at least partially web-sided voids, the sides extending alternately longitudinally and transversely. In perhaps the simplest form, the upright web stringers may be formed with alternately oppositely transversely opening voids, in all cases the voids being described by the upright web parts and likewise opening in opposite directions toward the web edges against the final surface layers. In more complex forms, the upright web stringers may be formed by web parts completely longitudinally and transversely enclosing the voids, the voids being of rectangular configuration longitudinally joined by longitudinally extending webs in one form and of longitudinally abutting plus shaped configuration in another form. Thus, in all cases of use of the core upright web stringer concept for providing the composite structural core assembly of the present invention, the various forms of the stringers may be prefabricated and used as modular elements during assembly for the fabricating of any of a multiplicity of different size and shape final structural core assemblies, with or without the foam filler for the additional structural integrity as hereinbefore discussed, the stringer concept giving relatively wide versatility for the constructions and methods of the present invention and not being confined to the limitations of the prior honeycomb core constructions.

It is still an additional object of the present invention to provide composite structural core assemblies and methods of making the same of the foregoing general character, all of which are particularly adapted to various supplemental strengthening additions giving increased structural integrity and strength according to the particular application requirements of the final structural core assembly. As hereinbefore pointed out, virtually all of the core upright web cell forms may be provided with increased crush strength and structural integrity by use of the core foam filling, the foam adding overall stiffness for the final assembly, but more important, serving to retain the core upright webs in their proper upright positions wherein these webs have the maximum crush strength against forces applied to the outer surfaces of the surface layers of the assembly. Other supplementary strength-increasing elements may also be added, such as providing the core upright webs with edge flanges extending parallel to and secured to the surface layers adding peel resistance of the surface layers from the web edge securements, or convoluting of the core upright webs in their longitudinal and transverse extensions adding additional crush strength for the overall assembly, or linear joining members longitudinally along core stringers and transversely between assembled core stringers for aiding in the curved formation of and between said stringers, as well as likewise adding structural integrity to the overall assembly.

Other objects and advantages of the invention will be apparent from the following specification and the accompanying drawings which are for the purpose of illustration only.

BRIEF DESCRIPTION OF THE DRAWINGS

FIG. 1 is a fragmentary perspective view of an embodiment of core stringer adapted for use in constructing one of the composite structural core assemblies of the present invention;

FIG. 2 is a reduced, fragmentary perspective view of one form of core assembly using the stringer of FIG. 1;

FIG. 3 is a reduced, fragmentary perspective view of another form of core assembly using the stringer of FIG. 1;

FIG. 4 is an enlarged, fragmentary top plan view of a core stringer similar to that of FIG. 1 but having certain upright webs thereof formed convoluted;

FIG. 5 is a fragmentary, perspective view of still another form of core stringer according to the principles of the present invention;

FIGS. 6, 7, 8, 9, 10, 11, 12 and 13 are fragmentary, vertical sectional views illustrating sequential method steps for forming a representative composite structural core assembly using the core stringer form of FIG. 1;

FIG. 14 is a fragmentary, top plan view of the intermediate step structure of FIG. 7;

FIG. 15 is a fragmentary, top plan view of an embodiment of composite structural core assembly using the core stringer form of FIG. 1 and having securement strengthening fillets between the stringer web edges and covering surface layers;

FIG. 16 is an enlarged, fragmentary vertical sectional view looking in the direction of the arrows 16—16 in FIG. 15;

FIG. 17 is a fragmentary, top plan view of an embodiment of composite structural core assembly using the stringer of FIG. 1 modified to include web edge flanges for additional peel strength and structural integrity between the stringers and surface layers;

FIG. 18 is an enlarged, fragmentary vertical sectional view looking in the direction of the arrows 18—18 in FIG. 17;

FIGS. 19, 20, 21 and 22 are vertical sectional views illustrating particular sequential method steps for fabricating a representative composite structural core assembly according to certain procedures of the present invention;

DESCRIPTION OF THE BEST EMBODIMENTS CONTEMPLATED

Figure 23:
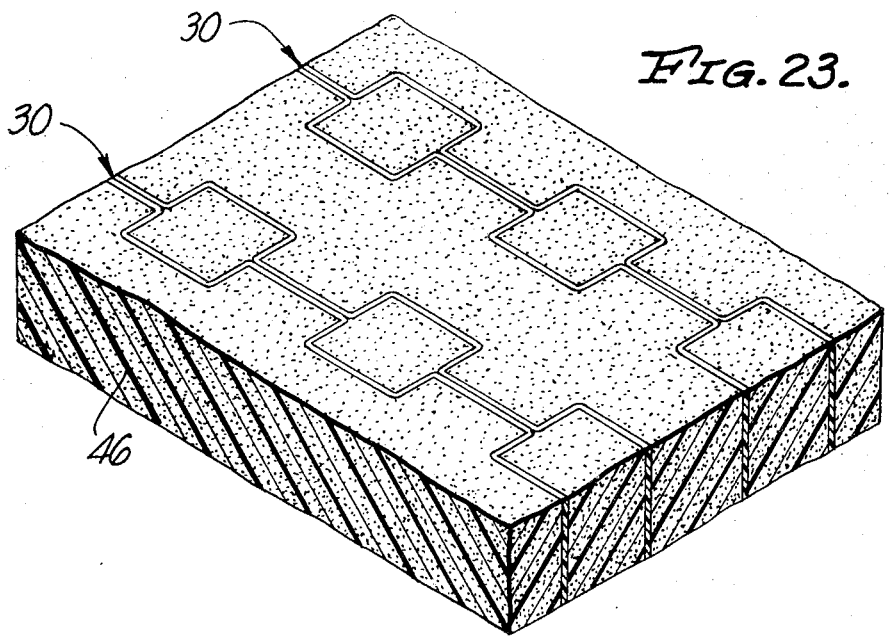
FIG. 23 is a fragmentary, perspective view of a foam-filled stringer core assembly constructed according to certain principles of the present invention using the stringer of FIG. 1 and adapted for use in forming a final composite structural core assembly according to certain of the principles of the present invention.

Referring to FIG. 1 of the drawings, an embodiment of a generally longitudinal extending stringer generally indicated at 30 adapted for forming a part of a composite structural core assembly includes a pair of transversely secured, upright webs generally indicated at 32 and 34, the secured webs forming a longitudinal series of rectangular web enclosures 36 longitudinally connected by secured, longitudinal web parts 38. In view of the webs 32 and 34 being upright webs and each forming a half of the stringer 30, the resulting web enclosures 36 are longitudinally and transversely closed, rectangular enclosures opening oppositely at opposite web edges 40. Furthermore, and more important to the principles of the present invention, it is pointed out that the stringer 30 and the web enclosures 36 and the longitudinal web parts 38 are formed solely of alternate longitudinally and transversely extending, connected web parts, so that the web parts of the upright webs are connected at generally right angles.

In the final composite structural core assembly, a series of the generally longitudinal stringers 30 are assembled transversely adjacent spaced short distances transversely apart or having longitudinal web parts transversely abutting or having said longitudinal web parts transversely abutting and secured, depending on the particular final assembly desired and the ultimate strength conditions to be met. A specific application of use of the stringer 30 in the formation of a specific composite structural core assembly is illustrated by the consecutive method steps shown in FIGS. 6 through 14. In this case, the series of the stringers 30 are longitudinally extending and transversely adjacent stringers, but spaced determined distances transversely apart forming a final construction having compound curves in directions toward the web edges 40 of the stringers 30 such as, for instance, a boat hull.

Referring to FIG. 6, a wooden latticed frame or form 42 is constructed having the final curved contour of the composite structural core assembly desired. Although the various possible choices of materials for forming the composite structural core assemblies of the present invention will be hereinafter discussed in detail, in this particular instance, the assembly will be formed of resin coated and impregnated fiber glass and plastics as will be pointed out. Thus, the latticed form 42 is first covered by sheets of paper 44 which are fastened in place over the form.

As shown in FIG. 7, the stringers 30 are assembled, one at a time, over the paper-covered form 42, each stringer being curved in its longitudinal extension in directions toward the stringer web edges 40 by flexing the web parts in their longitudinal and transverse directions of extension as required to conform to the contour of the form 42. It is important to point out for purposes of proper definition, that the longitudinal and transverse directions used herein are those of the individual and assembled stringers 30 and do not refer nor relate to the longitudinal or transverse extensions of the object being constructed. For instance, in the boat hull being constructed by the particular method steps of FIGS. 6 through 14, it will be noted that for desired strength characteristics and as best seen in FIG. 14, the series of longitudinally extending and transversely adjacent, but spaced, stringers 30, although assembled parallel are angled relative to the true longitudinal axis of the boat hull, the only true importance being attached thereto for purposes of the present invention being that the stringers 30 required to curve in compound curves both longitudinally and transversely.

In preparation for the initial construction or laying up step of FIG. 7 of the series of the stringers 30, the stringers are initially formed, in this case, from resin coated and impregnated fiber glass, the webs 32 and 34 being secured together as shown in FIG. 1 and previously described. Furthermore, the stringers 30 are initially formed planar or with the opposite web edges 40 extending in spaced planes defining flat surfaces. Thus, during the initial assembly step of FIGS. 7 and 14, the longitudinal parts of the stringer webs 32 and 34 are flexed substantially longitudinally and the transverse parts thereof are flexed substantially transversely and there is no inordinate twisting or angling of the various webs which could cause collapse or crumpling from their upright extensions. In this manner, a modular-type layup of the previously stock-formed stringers 30 may be accomplished and the stringers are temporarily fastened in place on the form 42 after the flexed assembly of each is obtained.

In the next step of assembly as illustrated in FIG. 8, a foam 46 is installed filling transversely between the stringers 30 as well as filling the web enclosures 36. The foam 46 in this example is preferably a plastic foam such as one of the cellular foams commonly used in hull construction, for instance, polyurethane of the type capable of being foamed in place. The paper 44 covering the form 42 permits a slight surplusage of the foam at the undersides of the stringers 30 and a sufficient amount of the foam 46 is installed to result in a slight surplusage at the exposed sides of the stringers 30 as well.

In any event, the combined stringers 30 and the foam 46 complete the core portion of the final composite structural core assembly and the surplusage of foam at the exposed sides of the stringers 30 is faired off or removed with a sander or hot tool so that the combined stringer web edges 40 and the foam 46 at this exposed side define a progressively curved surface extending continuously longitudinally and transversely as illustrated in FIG. 9, the foam filling adhering to the stringer webs 32 and 34.

In the next method step illustrated in FIG. 10, an outer surface layer 48 of resin coated and impregnated fiber glass is applied, preferably in wet form before the curing and rigidity of the resin, over the stringer web edges 40 conforming to said web edges and the continuous longitudinal and transverse curved surface defined thereby. The curing of the resin of the outer surface layer 48 adheres the surface to the stringer web edges 40 and the foam 46 with the layer ultimately reaching its rigid form to maintain the stringers 30 in their temporarily fastened curved configurations. The entire assembly may then be removed from the form 42 with the position thereof reversed as illustrated in FIG. 11 exposing the original underside thereof. The excess of the foam 46 is then removed as illustrated in FIG. 12 so that the combined stringer web edges 40 at this original underside and the surfaces of the foam 46 present a uniform, continuously extending longitudinal and transverse, curved surface ready for the completion of the composite structural core assembly.

Finally, as illustrated in FIG. 13, an inner surface layer 50 of resin coated and impregnated fiber glass is applied in wet form conforming to the surface defined by the stringer web edges 40 and the surface of the foam 46, the curing thereof producing rigidity and adherence to the web edges and foam.

The final composite structural core assembly has extremely high strength based on the high compression value of the stringers 30 and the webs 32 and 34 thereof, particularly combined with the foam 46 which not only enhances the bond between the stringer web edges 40 and the outer and inner surface layers 48 and 50, but also provides certain compressive strength between the outer and inner surface layers and, more important, supports the stringer webs 32 and 34 in their upright positions preventing buckling and other distortion. Still additionally, this unique composite structural core assembly has been provided by the modular stringers 30 which, in the final structure, present a multiplicity of separate structural cells as defined by the web enclosures 36 retained positioned by the stringer longitudinal web parts 38 and the foam 46.

Obviously, the foregoing method of forming a composite structural core assembly according to the present invention and the particular product produced thereby is merely a single illustration of a unique cell core form adaptable to a wide variety of constructions and methods, certain modified constructions and methods to be hereinafter discussed. Furthermore, the composite structural core assembly of the present invention lends itself to use of a wide variety of materials, depending on the particular end product to be produced and the particular service conditions which such product must satisfy. Also, again dependent on the service conditions to be encountered by the end product being constructed, a given overall construction might be composed of different forms of structural core assembly according to the principles of the present invention, for instance, where loading conditions are of greater magnitude in one location than another, or where particular stresses are encountered in one location and other types of stresses in other locations.

According to the broader principles of the present invention, the basic core-forming upright webs may be formed, for example, from the thermosetting resins, such as polyester, epoxy, or phenolic resins, or thermoplastic resins such as styrene or polycarbonate, with or without reinforcement. If no reinforcement is used, the resin may be cast, calendared or molded into shape, and with reinforcement, fibers or fabrics of fiber glass, polypropylene, acrylic, graphite, boron nitride, or vegetable materials such as paper or cardboard. Metal may also be used for the upright webs, whether the webs are in stringers or other forms to be hereinafter discussed, examples of possible metals being aluminum, steel or titanium rolled or stamped into shape.

The cellular foam portion of the core structure may be one of the thermosetting foams such as polyurethane, or polyester, or one of the thermoplastic foams such as vinyl, styrene, polyethylene or polypropylene. The foam may also be formed by the use of a thermosetting or thermoplastic resin filled with microballoons or glass nodules to reduce the density of the final composite. Still other materials may be used, such as various types of metals, glass or rubber, all again depending on the service conditions to be met.

The final important elements of the composite structural core assembly of the present invention, the surface layers may be formed of the same materials as those discussed relative to the core upright web cells or stringers. It should be kept in mind, however, that the materials of the surface layers need not necessarily, in one single structure, be the same as the core upright web materials, still again depending on the service conditions to be met by the final overall assembly. As merely one example, it is easily conceivable that the upright web core cells or stringers could be formed of a resin coated and impregnated paper or cardboard or a pressed vegetable fiber, while in the same assembly, the surface layers might be resin coated and impregnated fiber glass fabric or metal. The important thing is that the foregoing material listing illustrates the extremely wide versatility of the broader principles of the present invention, even though from the standpoint of economics, wide application and versatility in application for an extremely wide variety of uses, the more modern fiber glass with plastic foams is undoubtedly the more preferred form.

Returning to the specific illustrations of the drawings, where it is desired to add more strength to the core portion of the composite structural core assembly, the stringers 30 may be modified in various manners, both as to the configured formations thereof and the positioning thereof relative to each other. In FIG. 4, there is illustrated a portion of a stringer 52, very close to the configuration of the previous stringers described, with the exception that certain upright web parts are formed convoluted or corrugated, as shown, the upright web parts 54 forming portions of the enclosures 56 and longitudinal web parts 58 connecting the enclosures 56. These convoluted or corrugated parts of the upright webs give increased crush strength, as well as certain ease of flexed curvature.

As illustrated in FIG. 2, the same stringers 30 of FIG. 1 extending generally longitudinally are positioned with the enclosures 36 thereof transversely abutting and, if desired, transversely secured. The stringers 30 in the overall sheet of FIG. 2 may be assembled flat and later longitudinally and/or transversely partially or fully curved, or even curved during assembly, all dependent on requirements. Obviously, by positioning the stringers 30 transversely abutting, a much denser core of the upright webs is provided greatly increasing the crush strength in the final composite structural core assembly.

In the partial assembly illustrated in FIG. 3, the stringers 30 extend longitudinally and transversely adjacent, but are spaced transversely apart as in the method previously described. In order to eliminate the necessity of extensive fastening of the stringers 30 during assembly for retaining the flexed positioning thereof, however, a series of longitudinal wires 60 are positioned extending continuously longitudinally through the stringers 30 and a like series of transverse wires 62 are positioned extending continuously transversely through the upright web enclosures 36. Thus, although a previous flat assembly of the stringers 30 is required, when the stringers are placed in the core assembly and flexed for proper curvature, the wires 60 and 62 will retain such curvature and little, if any, additional fastening will be required.

In FIG. 5 is illustrated a stringer 64 formed by a longitudinal series of directly connected or secured upright web cells or enclosures 66, each enclosure still being formed by alternate longitudinal and transverse web parts joined at right angles for the web-flexing qualities as hereinbefore described, but each enclosure being plus shaped. In other words, each of the enclosures 66 of the stringer 64 is formed by two longitudinally spaced and opening U-shaped parts and two transversely spaced and opening U-shaped parts, all opening into a common central portion of the enclosure 66. This form of construction will give a concentration of crush strength in the final composite structural core assembly and may be used as longitudinally extending stringers which are transversely adjacent, either abutting or secured abutting or transversely spaced apart.

Where increased peel strength of the surface layers from the upright web core is required in the final composite structural core assembly, several modifications may be provided, one of which is illustrated in FIGS. 15 and 16 using essentially the same stringer 30, the same foam 46 and the same surface layers 48 and 50. Referring to FIGS. 15 and 16, after the assembly of the stringers 30 and the installation of the foam 46 filling and adhering thereto, the foam 46 is removed at the web edges 40 in an angular recess 68 and the recesses are filled with resin to form reinforcing fillets 70. This gives a reinforced bond between the stringer web edges 40 and the surface layers 48 and 50 so as to increase the peel strength of the surface layers from the stringer web edges in the final assembly.

Even greater peel strength can be provided by the modified form shown in FIGS. 17 and 18 wherein a similar form of stringer 72, but slightly modified, is used without a foam filling, but with similar surface layers 74 and 76. Here, certain of web edges 78 are formed with flanges 80 extending parallel to and abutting the surface layers 74 and 76, being bonded thereto by resin or similar bonding materials. The added strength provided by the flanges 80 supporting the upright webs of the stringer 72 not only provide increased peel strength between the stringer web edges 78 and the surface layers 74 and 76, but also provide a secure retainment of the upright webs of the stringer against distortion during the application of crushing forces against the surface layers, all of which permits the elimination of the foaming, although foaming could be added for even additional strength.

Another method of providing a composite structural core assembly is illustrated in FIGS. 19 through 22 wherein a mold 82 is provided having a curved molding surface 84. As shown in FIG. 19, an outer surface layer 86 of resin coated and impregnated fiber glass is laid up onto the molding surface 84 so as to assume the curved configuration and also to assume a rigid condition in such curved configuration after resin curing. Thereafter, as shown in FIG. 20, a series of flat formed of the stringers 30, likewise cured, resin coated and impregnated fiber glass, are positioned over the outer surface layer 86 as desired and covered with a usual vacuum blanket 88, the evacuation of the air therefrom forcing the stringers 30 into their flex-curved configuration for bonding to the outer surface layer 86 retaining the stringers in place. The degrees and methods of resin curing of the outer surface layer 86 prior to the assembly and bonding of the stringers 30 are variable depending on assembly conditions and requirements, and are furthermore well known to those skilled in the art so as not to be necessary of description herein, these particular curing and bonding procedures not forming a part of the present invention other than in the particular combination shown.

After the assembly, bonding and curing of the stringers 30 and the outer surface layer 86 as described, the stringers are foam-filled with cellular foam 90, such as polyurathane, and as shown in FIG. 21, followed by the removal of excess foam so that the assembly presents a smoothly curved inner stringer and foam surface. The final step shown in FIG. 22 is the application and bonding of an inner surface layer 92 similar to the outer surface layer 86 and the curing thereof. Thus, the final composite structural core assembly includes the stringers 30 with the filling foam 90 adhering thereto and the outer and inner surface layers 86 and 92 bonded to the stringers and adhering to the foam, so that the completed assembly can be removed from the mold 82.

Figure 24:
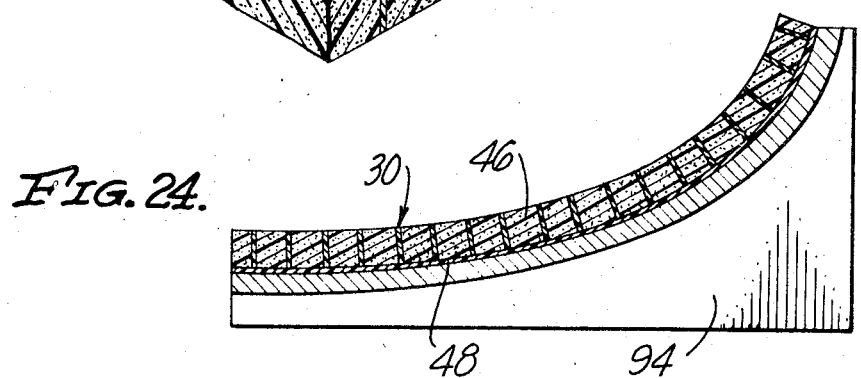
FIGS. 24 and 25 are vertical sectional views illustrating sequential method steps for forming a final composite structural core assembly using the foam-filled stringer core of FIG. 23.
Figure 25:
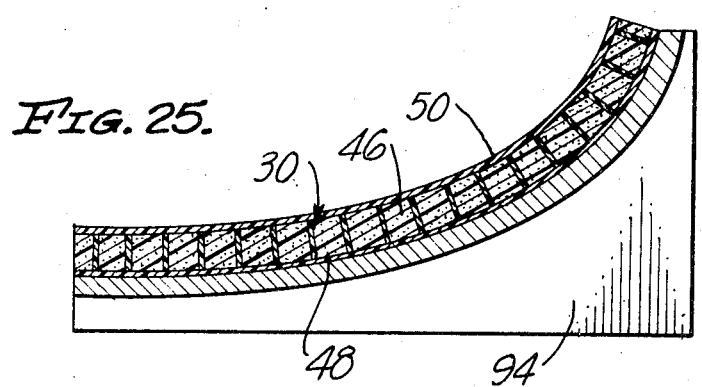

Still another alternate form of construction and method using the stringers 30 is illustrated in FIGS. 23, 24, and 25 wherein the positioned stringers 30 in their original rigid flat forms are assembled longitudinally extending and transversely spaced apart, the stringer core skeleton being filled in this flat state with the cellular foam 46 as shown in FIG. 23. For purposes of the present method, the cellular foam 46 will be one of the thermoplastic foams, such as vinyl, styrene, polyethylene and polypropylene. The core assembly, consisting of the stringers 30 and the foam 46 thereby forms a flat sheet core.

The next step, not illustrated, is to lay up the outer surface layer 48 on a curved mold 94, and then heat- and curve-assemble the previously assembled core sheet of the stringers 30 and the foam 46, bonding the same to the outer surface layers as shown in FIG. 24. The heating of the thermoplastic foam 46 will permit it to conform to the gentle curve of the outer surface layer 48 and the simultaneous flexing of the stringers 30 will result in the subassembly shown. The final method step is shown in FIG. 25 consisting merely of the curved application of the inner surface layer 50 to the previous subassembly, thereby completing the overall composite structural core assembly for removal from the mold 96.

Figure 26:
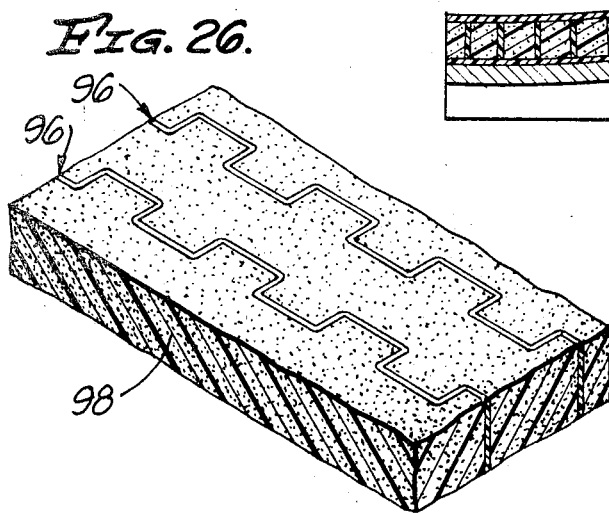
FIG. 26 is a fragmentary, perspective view of a foam-filled stringer core assembly similar to FIG. 23 but using a simplified form of stringers.

The final core assembly illustrated is shown in FIG. 26 and consists of a series of longitudinally extending and transversely spaced stringers 96, each being formed by a single upright web and having alternate, oppositely transversely opening, U-shaped web parts as shown. In other words, the stringers 96 are formed from continuous alternate longitudinal and transverse web parts producing a longitudinal series of transverse offsets or enclosures which are closed in one transverse direction and open in the other transverse direction, as well as opening web edgewise in both directions. A filling of cellular foam 98 is added to retain the stringers 96 in assembly with the result being a flat core assembly which may be used in the same manner described above in the method of FIGS. 23, 24 and 25. Obviously, the resulting composite structural core assembly will have a reduced crush strength, but will be adequate for many applications.

According to the constructions and methods of the present invention, therefore, a composite structural core assembly is provided wherein the final composite assembly has at least portions of the surface layers thereof describing progressively curved surfaces, and even compound curved surfaces, yet without appreciable distortion of the webs forming the core and without any appreciable loss of web compressive strength in the final composite assembly. Furthermore, by different unique modifications, it is possible to increase certain strength factors in the final assembly to meet particular requirements, and the principles of the invention lend themselves to a modular stringer form of core assembly, not possible in the same manner with prior structural core concepts. Additionally, even with the foregoing advantages, all illustrated and described in the foregoing and the accompanying drawings, the unique composite structural core assembly concept of the present invention is extremely versatile and adapted for fabrication from an extremely wide variety of materials, again dependent on the service conditions to be met.

I claim:

1. In a composite structural core assembly, the combination of: a series of generally longitudinally extending and generally transversely adjacent stringers, each of said stringers being formed by a pair of substantially rigid, upright webs secured to one another at spaced intervals along the longitudinal extension thereof and configured to define a longitudinal series of web enclosures encompassing stringer voids opening at opposite common web edges, each of said stringers being formed of generally longitudinally and generally transversely extending web parts, and each of said web enclosures being formed totally of spaced longitudinal and spaced transverse web parts, certain of said stringers being curved in longitudinal extension in directions toward said common web edges, the common web edges of said certain stringers defining progressively curved surfaces; said stringers being positioned with said stringer web enclosures transversely spaced from transversely adjacent stringers, and certain of said longitudinal web parts of certain of said stringer web enclosures being formed with elongated joining members extending between and through adjacent stringers; and a pair of substantially rigid, opposite surface layers secured to said stringer common web edges and extending along and generally conforming to said progressively curved surfaces.

2. A composite structural core assembly as defined in claim 1 in which a final shape-self-sustaining, cellular foam is positioned between said surface layers substantially filling between said stringers and said stringer web enclosures and adhering to said surface layers and to said stringer webs.

3. A composite structural core assembly as defined in claim 1 in which said stringer web enclosures are generally rectangular web enclosures.

4. A composite structural core assembly as defined in claim 1 in which said stringer web enclosures are rectangular web enclosures and in which successive ones of said web enclosures of each stringer are separated by a pair of longitudinally extending web parts secured to one another.

5. A composite structural core assembly as defined in claim 1 in which each of said stringer web enclosures is formed by at least two longitudinally aligned and longitudinally spaced U-shaped web parts and at least two transversely aligned and transversely spaced U-shaped web parts all opening into a common central enclosure part.

6. A composite structural core assembly as defined in claim 1 in which said stringer web enclosures are rectangular web enclosures and each of said web enclosures of each stringer is defined by a pair of transversely spaced longitudinally extending web parts; and in which said last-named longitudinally extending web parts of stringer web enclosures on transversely adjacent stringers are abutting and secured.

7. A composite structural core assembly as defined in claim 1 in which certain of said longitudinal web parts of said stringers are convoluted in longitudinal extension thereof.

8. A composite structural core assembly as defined in claim 1 in which certain of said opposite common web edges of said stringer webs are formed flanged extending parallel to and secured to said surface layers.

* * * * *